(12) United States Patent
Katsuda et al.

(10) Patent No.: US 8,279,322 B2
(45) Date of Patent: Oct. 2, 2012

(54) IMAGE PICKUP DEVICE INCLUDING ISOTROPIC MIRROR

(75) Inventors: Yasutoshi Katsuda, Osaka (JP); Kazuhito Shimoda, Kyoto (JP); Yasuo Maeda, Osaka (JP); Nobuyuki Kodama, Hyogo (JP)

(73) Assignee: Sony Corporation, Tokyo (JP)

( * ) Notice: Subject to any disclaimer, the term of this patent is extended or adjusted under 35 U.S.C. 154(b) by 123 days.

(21) Appl. No.: 12/729,426

(22) Filed: Mar. 23, 2010

(65) Prior Publication Data

US 2010/0277637 A1 Nov. 4, 2010

(30) Foreign Application Priority Data

May 1, 2009 (JP) ................................. 2009-111766
Dec. 17, 2009 (JP) ................................. 2009-286657

(51) Int. Cl.
*H04N 5/225* (2006.01)
*H04N 5/232* (2006.01)
*G03B 13/00* (2006.01)
*G02B 26/08* (2006.01)
*G02B 26/10* (2006.01)
*G02B 26/12* (2006.01)

(52) U.S. Cl. ..................... 348/344; 348/345; 359/201.2

(58) Field of Classification Search .......... 348/335–340, 348/345–350; 359/201.2, 583
See application file for complete search history.

(56) References Cited

U.S. PATENT DOCUMENTS

| | | | | |
|---|---|---|---|---|
| 5,424,876 A | * | 6/1995 | Fujii | 359/884 |
| 7,119,319 B2 | * | 10/2006 | Noto et al. | 250/208.1 |
| 2004/0042213 A1 | * | 3/2004 | Kimura et al. | 362/317 |
| 2004/0085604 A1 | * | 5/2004 | Ikegame | 359/212 |
| 2005/0168622 A1 | * | 8/2005 | Kawai et al. | 348/360 |
| 2005/0264677 A1 | * | 12/2005 | Uchida | 348/340 |
| 2008/0037118 A1 | * | 2/2008 | Senoue et al. | 359/449 |
| 2008/0198457 A1 | * | 8/2008 | Sakai et al. | 359/507 |
| 2009/0122175 A1 | * | 5/2009 | Yamagata | 348/335 |
| 2009/0219435 A1 | * | 9/2009 | Yuan | 348/360 |

FOREIGN PATENT DOCUMENTS

JP 2004-212891 7/2004

* cited by examiner

*Primary Examiner* — Kelly L Jerabek
(74) *Attorney, Agent, or Firm* — Oblon, Spivak, McClelland, Maier & Neustadt, L.L.P.

(57) ABSTRACT

An image pickup device includes a fixedly provided half mirror that separates object light that has passed through a shooting optical system into transmitted light and reflected light, and an image pickup unit that generates an image of an object by receiving the transmitted light. The half mirror includes an optically transmissive film that is optically isotropic.

11 Claims, 9 Drawing Sheets

130A

IMAGE PICKUP DEVICE INCLUDING ISOTROPIC MIRROR

BACKGROUND OF THE INVENTION

1. Field of the Invention

The present invention relates to an image pickup device including a fixed type half mirror.

2. Description of the Related Art

An image pickup device, such as a digital camera, of the following type has been proposed. In this type, a fixed type half mirror (semitransmissive mirror) is provided at an optical path of object light that has passed through a shooting lens. This makes it possible to perform focus detection of an object by receiving light transmitted through the half mirror by an image pickup element and by causing reflected light to be incident upon an AF sensor. (Refer to, for example, Japanese Unexamined Patent Application Publication No. 2004-212891.)

In such a half mirror, a polyethylene terephthalate (PET) film or a glass plate is used as a base material.

SUMMARY OF THE INVENTION

However, since the PET film is produced by a drawing process (vertical drawing and horizontal drawing operations), the PET film is optically anisotropic, so that a polarizing axis exists. Therefore, part of the object light is absorbed by the PET film, as a result of which there is a loss in light quantity.

As a result, transmittance differs for each wavelength in accordance with a direction of disposition of the PET film (refer to FIG. 7). This results in a loss in white balance for the image pickup element and the image pickup device. This is fatal to the performance of the image pickup device (that is, colors are not properly reproduced).

The glass plate is optically isotropic, so that the aforementioned loss in light quantity can be reduced. However, if the glass plate becomes thinner, its strength is reduced, as a result of which the glass plate tends to break.

The present invention is achieved in view of the aforementioned problems. It is desirable to provide an image pickup device which can reduce light quantity loss while preventing breakage in a fixed type half mirror.

According to an embodiment of the present invention, there is provided an image pickup device including a fixedly provided half mirror that separates object light that has passed through a shooting optical system into transmitted light and reflected light, and an image pickup unit that generates an image of an object by receiving the transmitted light. The half mirror includes an optically transmissive film that is optically isotropic.

According to the embodiment of the present invention, the fixed type half mirror that separates object light that has passed through the shooting optical system into transmitted light and reflected light includes an optically transmissive film that is optically isotropic. Therefore, it is possible to reduce light quantity loss while restricting breakage in the fixed type half mirror.

DESCRIPTION OF THE PREFERRED EMBODIMENTS

First Embodiment

Structure of Main Portion of Image Pickup Device

Figure 1:
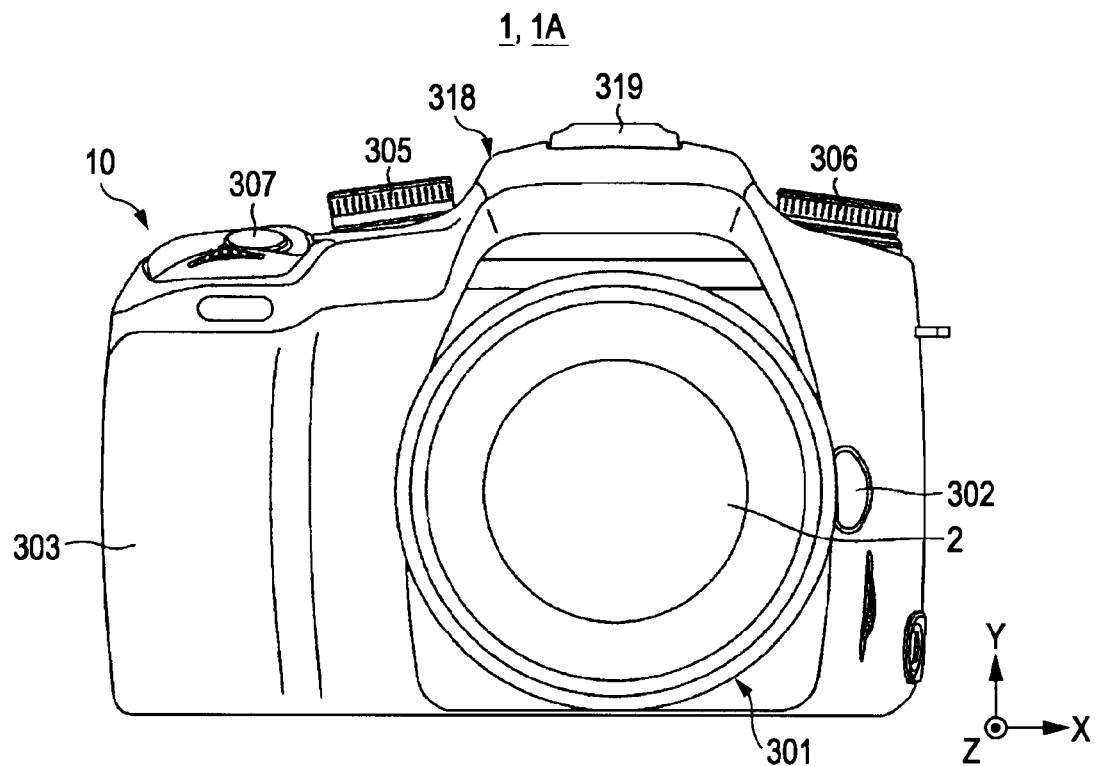
FIG. 1 is a front view of an external structure of an image pickup device according to a first embodiment of the present invention.

FIG. 1 is a front view of an external structure of an image pickup device 1 according to a first embodiment of the present invention.

The image pickup device 1 is formed as a digital still camera. The image pickup device 1 includes a camera body 10 and an interchangeable lens 2 serving as a shooting lens that is mountable to and removable from the camera body 10.

In FIG. 1, the front surface of the camera body 10 is provided with a mount portion 301, a lens interchangeable button 302, and a grip portion 303. The mount portion 301 has the interchangeable lens 2 mounted thereto at substantially the center of the front surface of the camera body 10. The lens interchangeable button 302 is disposed on the right of the mount portion 301. The grip portion 303 is provided for allowing gripping. In addition, the camera body 10 is provided with a mode setting dial 305, a control value setting dial 306, and a shutter button 307. The mode setting dial 305 is disposed on the upper left portion of the camera body 10 as viewed from the front side of the camera body 10. The control value setting dial 306 is disposed at the upper right portion of the camera body 10 as viewed from the front side of the camera body 10. The shutter button 307 is disposed on the upper surface of the grip portion 303.

The upper portion of the camera body 10 is provided with a flash section 318 and a connection terminal section 319. The flash section 318 is formed as a pop-up type built-in flash section. The connection terminal section 319 is used when mounting, for example, an external flash section to the camera body 10.

Figure 3:
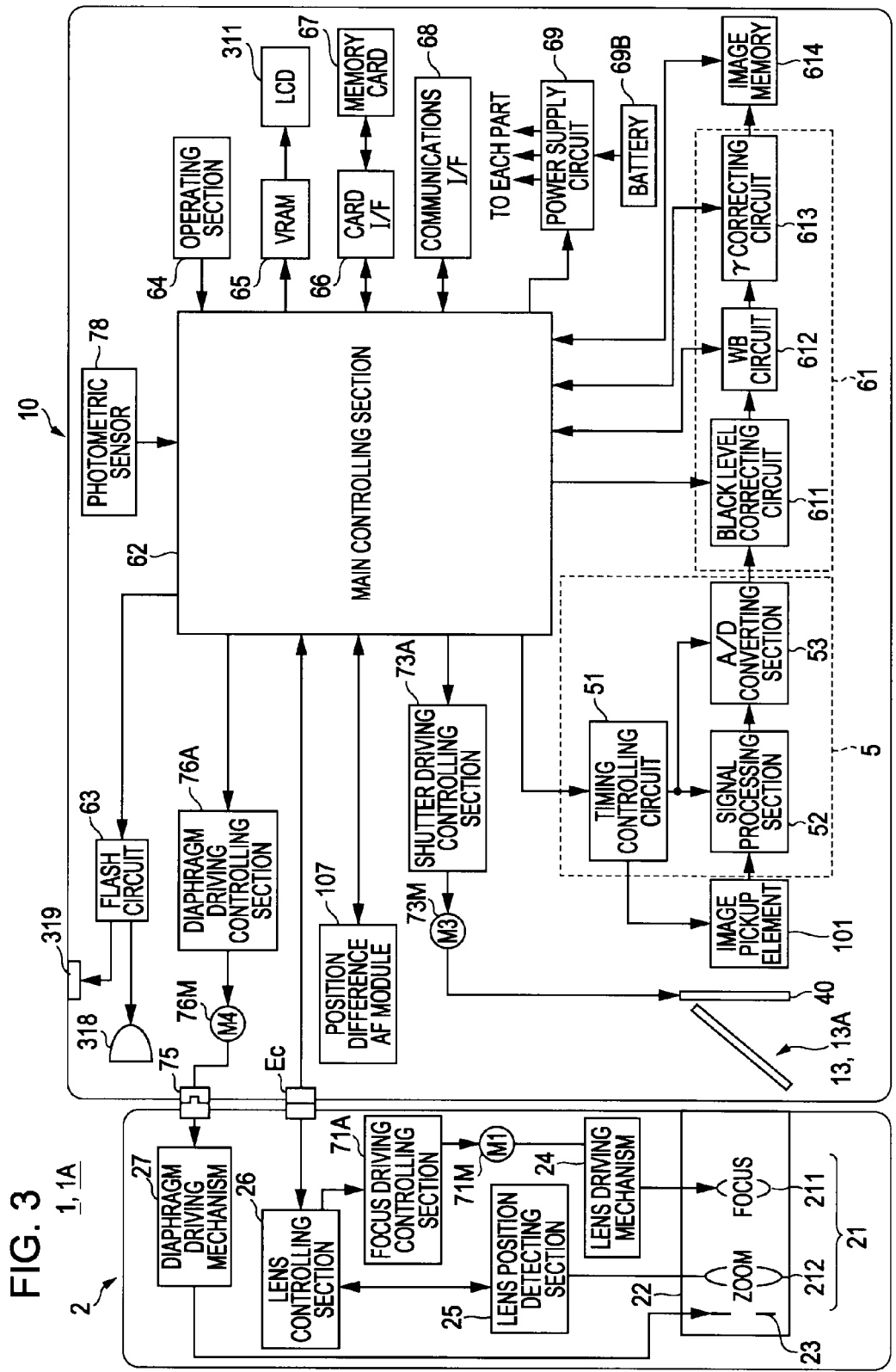
FIG. 3 is a block diagram of an electrical structure of the image pickup device.

The mount portion 301 is provided with a connector Ec (see FIG. 3) and a coupler 75 (see FIG. 3). The connector Ec is provided for electrical connection with the mounted interchangeable lens 2. The coupler 75 is provided for mechanical connection with the mounted interchangeable lens 2.

The lens interchangeable button 302 is a button that is pressed when removing the interchangeable lens 2 mounted to the mount portion 301.

The grip portion 303 is a portion of the image pickup device 1 that is gripped when a user performs a shooting operation. The surface of the grip portion 303 is made rough in accordance with the shapes of the fingers of users for increasing fittability. A battery accommodating chamber and a card accommodating chamber (not shown) are provided in the grip portion 303. A battery 69B (see FIG. 3) is accommodated as a camera power supply in the battery accommodating chamber. A memory card 67 (see FIG. 3) for recording image data of a shooting image is removably accommodated in the card accommodating chamber. The grip portion 303 may be provided with a grip sensor for detecting whether or not the user has gripped the grip portion 303.

The mode setting dial 305 and the control value setting dial 306 are substantially disc-shaped members that are rotatable in a plane substantially parallel to the upper surface of the camera body 10. The mode setting dial 305 is provided for alternatively selecting functions and modes provided in the image pickup device 1, such as an automatic exposure (AE) control mode or an autofocus (AF) control mode, various shooting modes (such as a still image shooting mode for shooting one still image or a continuous shooting mode for continuous shooting), or a reproduction mode for reproducing a recorded image. The control value setting dial 306 is provided for setting a control value for each of the various functions provided in the image pickup device 1.

The shutter button 307 is a pressing switch that allows a partial pressing operation (resulting in a "partially pressed state") and a full pressing operation (resulting in a "fully pressed state" by further pressing the shutter button 307). If, in the still image shooting mode, the shutter button 307 is partially pressed, a preparation operation for shooting a still image of an object is executed (such as setting an exposure control value or performing focus detection). If the shutter button 307 is fully pressed, shooting operations (that is, operations performed so that, for example, an image pickup element 101 (see FIG. 2) is exposed, a predetermined image processing operation is performed on an image signal obtained by the exposure, and the processed image is recorded on the memory card 67 (see FIG. 3)) are carried out.

The interchangeable lens 2 functions as a lens window that takes in light from the object (that is, an optical image), and as a shooting optical system that guides the object light to the image pickup element 101 disposed in the camera body 10. The interchangeable lens 2 can be removed from the camera body 10 by pressing the lens interchangeable button 302.

Figure 2:
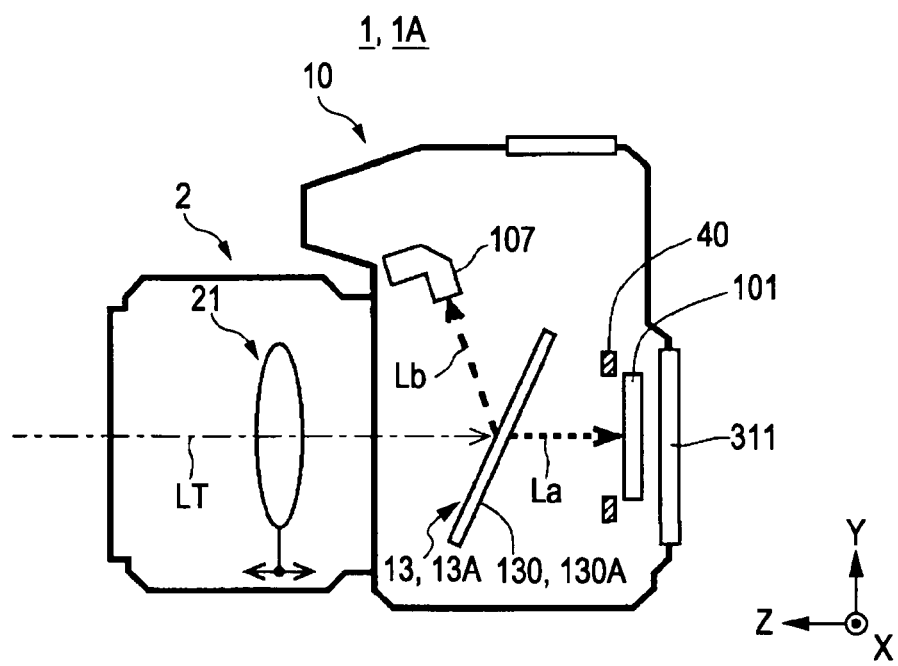
FIG. 2 is a vertical sectional view of the image pickup device.

The interchangeable lens 2 includes a lens group 21 including a plurality of lenses disposed in series along an optical axis LT (see FIG. 2). The lens group 21 includes a focus lens (see FIG. 3) for performing a focus adjustment, and a zoom lens 212 (see FIG. 3) for performing a magnification change. By driving the focus lens 211 or the zoom lens 212 in the direction of the optical axis LT (see FIG. 2), magnification is changed or focus adjustment is performed. The interchangeable lens 2 is provided with an operating ring that is provided at a suitable location on the outer periphery of a lens barrel and that is rotatable along an outer peripheral surface of the lens barrel. By manually or automatically operating the zoom lens 212, the zoom lens 212 is moved in the optical axis direction in accordance with the direction and amount of rotation of the operating ring, and is set to a zoom magnification (shooting magnification) in accordance with where the zoom lens 212 has been moved.

Internal Structure of Image Pickup Device 1

Next, the internal structure of the image pickup device 1 is described. FIG. 2 is a vertical sectional view of the image pickup device 1. As shown in FIG. 2, the image pickup element 101, a mirror section 13, a phase-difference AF module 107, etc., are provided in the camera body 10.

On the optical axis LT of the lens group of the interchangeable lens 2 when the interchangeable lens 2 is mounted to the camera body 10, the image pickup element 101 is disposed perpendicularly to the optical axis LT. As the image pickup element 101, for example, a Bayer arrangement CMOS color area sensor (CMOS image pickup element) is used. In the color area sensor, a plurality of pixels formed by photodiodes are disposed two dimensionally in a matrix, and color filters (such as red (R), green (G), and blue (B) color filters) having different spectral characteristics are disposed in a 1 to 2 to 1 ratio on the light-receiving surfaces of the respective pixels. The image pickup element 101 converts optical images of the object formed by passing through the interchangeable lens 2 into analog electrical signals (image signals) for the respective color components of red (R), green (G), and blue (B). The converted analog electrical signals are output as image signals for the respective colors, red (R), green (G), and blue (B).

The mirror section 13 (serving as a pellicle mirror (fixed type mirror) including a half mirror (semitransmissive mirror) 30 is secured to the camera body 10 so as to be situated forwardly of the image pickup element 101 on the optical axis LT. The half mirror 130 is formed so as to allow a portion of the object light transmitted through the interchangeable lens 2 to pass therethrough, and to reflect a remaining portion of the object light towards the phase-difference AF module 107. In other words, the half mirror 130 separates the object light transmitted through the interchangeable lens 2 into transmitted light La and reflected light Lb, and causes an image of the object to be generated at the image pickup element 101 that has received the transmitted light La. The structure of the half mirror 130 will be described in detail later.

The phase-difference AF module 107 is formed as what is called an AF sensor including, for example, distance-measurement elements that obtain focus detection information (focus information) of the object. The phase-difference AF module 107 is disposed obliquely above and to the right of the half mirror 130, and detects the position of a focus by performing a focus detection operation by a phase-difference detection method (hereunder also referred to as "phase-difference AF"). Since the phase-difference AF module 107 functioning as a focus detecting section can receive the reflected light Lb from the half mirror 130 during, for example, shooting, focus detection of the object can be performed.

A shutter unit 40 is disposed in front of the image pickup element 101. The shutter unit 40 is formed as a mechanical focal plane shutter that includes a vertically moving curtain member and that opens and closes an optical path of the object light guided to the image pickup element 101 along the optical axis LT by an opening and a closing operation of the curtain member. The shutter unit 40 can be omitted when the image pickup element 101 is one that allows use of a complete electronic shutter.

A liquid crystal display (LCD) 311 is provided at the back side of the camera body 10. The LCD 311 includes a color liquid crystal panel capable of performing image display. For example, the LCD 311 displays an image picked up by the image pickup element 101 or reproduces and displays a recorded image, and displays mode settings and functions provided in the image pickup device 1. In the LCD 311, when performing framing of the object prior to an actual shooting, a live view (preview) display in which the object is dynamically displayed on the basis of image signals successively generated by the image pickup element 101 that receives the transmitted light La of the half mirror 130 is performed.

Electrical Structure of Image Pickup Device 1

FIG. 3 is a block diagram of an electrical structure of the image pickup device 1. For example, members corresponding to those shown in FIGS. 1 and 2 are given the same reference numerals. For convenience of explanation, first, an electrical structure of the interchangeable lens 2 will be described.

In addition to the lens group 21, the interchangeable lens 2 is provided with a lens driving mechanism 24, a lens position detecting section 25, a lens controlling section 26, and a diaphragm driving mechanism 27.

In the lens group 21, the focus lens 211, the zoom lens 212, and a diaphragm 23 for adjusting the quantity of light that is incident upon the image pickup element 101 (provided in the camera body 10) are held along the optical axis LT (see FIG. 2) in the barrel. The lens group 21 takes in an optical image of the object, and focuses it on the image pickup element 101. In AF control, focusing is performed by driving the focus lens 211 by an AF actuator 71M (disposed in the interchangeable lens 2) in the direction of the optical axis LT.

On the basis of an AF control signal applied from a main controlling section 62 through the lens controlling section 26, a focus driving controlling section 71A generates a driving control signal to the AF actuator 71M for moving the focus lens 211 to its focus position. The AF actuator 71M is formed by, for example, a stepping motor, and applies lens driving power to the lens driving mechanism 24.

The lens driving mechanism 24 includes, for example, a helicoid and a gear (not shown) that rotates the helicoid. The lens driving mechanism 24 receives the driving power from the AF actuator 71M, and drives, for example, the focus lens 211 in a direction parallel to the optical axis LT. The direction and amount of movement of the focus lens 211 are in accordance with the direction of rotation and the number of rotations of the AF actuator 71M, respectively.

The lens position detecting section 25 includes an encode plate and an encoder brush, and detects the amount of movement of the lens group 21 when focusing the lens group 21. In the encode plate, a plurality of code patterns are formed at a predetermined pitch in the direction of the optical axis LT within a range of movement of the lens group 21. The encoder brush moves together with a lens while sliding along and contacting the encode plate.

The lens controlling section 26 includes, for example, a microcomputer having a memory such as ROM (which stores, for example, a control program) or a flash memory (which stores data regarding condition information) built therein.

The lens controlling section 26 communicates with the main controlling section 62 in the camera body 10 through the connector Ec. This makes it possible to send, for example, condition data (such as the focal length, the exit pupil position, the diaphragm stop value, and the focus distance of the lens group 21, and the light quantity of a peripheral area of the lens group 21) and information of the position of the focus lens 211 (detected by the lens position detecting section 25) to the main controlling section 62. In addition, this makes it possible to receive, for example, data of a driving amount of the focus lens 211 from the main controlling section 62.

The diaphragm driving mechanism 27 receives driving power from a diaphragm driving actuator 76M through the coupler 75, and changes the diameter of the diaphragm 23.

Next, an electrical structure of the camera body 10 will be described. In addition to the previously described image pickup element 101, the shutter unit 40, etc., the camera body 10 includes an analog front end (AFE) 5, an image processing section 61, an image memory 614, the main controlling section 62, a flash circuit 63, an operating section 64, VRAM 65, a card interface (I/F) 66, the memory card 67, a communications interface (I/F) 68, a power supply circuit 69, the battery 69B, a shutter driving controlling section 73A, a shutter driving actuator 73M, a diaphragm driving controlling section 76A, and the diaphragm driving actuator 76M.

The image pickup element 101 is formed by a CMOS color area sensor as mentioned above. A timing controlling circuit 51 (described later) controls image pickup operations such as reading out of a pixel signal, selection of an output of each pixel of the image pickup element 101, and starting (and ending) of an exposure operation of the image pickup element 101.

The AFE 5 applies a timing pulse that causes the image pickup element 101 to carry out a predetermined operation, performs a predetermined signal processing operation on image signals of the object output from the image pickup element 101, converts the image signals into digital signals, and outputs the digital signals to the image processing section 61. The AFE 5 includes, for example, the timing controlling circuit 51, a signal processing section 52, and an A/D converting section 53.

On the basis of a reference clock output from the main controlling section 62, the timing controlling circuit 51 generates predetermined timing pulses (that cause, for example, a vertical scanning pulse φVn, a horizontal scanning pulse φVm, and a reset signal φVr to be generated), outputs the predetermined timing pulses to the image pickup element 101, and controls the image pickup operations of the image pickup element 101. By outputting the predetermined timing pulses to the signal processing section 52 and the A/D converting section 53, the operations of the signal processing section 52 and the A/D converting section 53 are controlled.

The signal processing section 52 performs a predetermined analog signal processing operation on the analog image signals output from the image pickup element 101. The signal processing section 52 includes, for example, a correlated double sampling (CDS) circuit, an auto gain control (AGC) circuit, and a clamp circuit. In this AGC circuit, the image signals generated by the image pickup element 101 can be amplified so that gain is variable, and an ISO speed can be changed in accordance with a silver salt film by changing the gain. On the basis of the timing pulses output from the timing controlling circuit 51, the A/D converting section 53 converts the analog R, G, and B image signals output from the signal processing section 52 into digital image signals including a plurality of bits (such as 12 bits).

The image processing section 61 performs a predetermined signal processing operation on image data output from the AFE 5, and forms the AFE 5, and forms an image file. The image processing section 61 includes, for example, a black level correcting circuit 611, a white balance controlling circuit 612, and a gamma correcting circuit 613. The image data taken in by the image processing section 61 is written to the image memory 614 once in synchronism with the reading out of the image pickup element 101. Then, the image data written to the image memory 614 is accessed, so that an operation is carried out in each block of the image processing section 61.

The black level correcting circuit 611 corrects a black level of each of the R, G, and B digital image signals subjected to A/D conversion by the A/D converting section 53 into a reference black level.

On the basis of a white standard corresponding to a light source, the white balance correcting circuit 612 performs level conversion (white balance (WB) adjustment) on the digital signals of the corresponding R, G, and B color components. That is, on the basis of WB adjustment data applied from the main controlling section 62, the white balance controlling circuit 612 specifies a portion that is presumed to be actually white from, for example, color saturation data and brightness of a shooting object; determines the average of the R, G, and B color components of this portion; determines a G/R ratio and a G/B ratio; and corrects these levels as correction gain of R and B.

The gamma correcting circuit 613 corrects gradation characteristics of the image data subjected to the WB adjustment. More specifically, the gamma correcting circuit 613 performs nonlinear conversion using a gamma correction table (in which an image data level is previously set for each color component), and an offset adjustment.

In a shooting mode, the image memory 614 is a memory used as a working area that temporarily stores the image data output from the image processing section 61 and that is used for carrying out a predetermined operation on the image data by the main controlling section 62. In a reproduction mode, the image memory 614 temporarily stores the image data read out from the memory card 67.

The main controlling section 62 includes a CPU (operating as a computer), ROM (that stores a control program) or RAM (that temporarily stores data), and controls the operation of each section of the image pickup device 1.

In a flash shooting mode, the flash circuit 63 controls the amount of light emission of an external flash section connected to the connection terminal section 319 or the flash section 318 to the amount of light emission set by the main controlling section 62.

The operating section 64 includes, for example, the shutter button 307, and inputs operation information to the main controlling section 62.

The VRAM 65 is a buffer memory which is provided between the main controlling section 62 and the LCD 311 and which has storage capacity for storing image signals corresponding to the number of pixels of the LCD 311. The card I/F 66 is an interface that makes possible signal transmission and reception between the memory card 67 and the main controlling section 62. The memory card 67 is a recording medium that stores image data generated by the main controlling section 62. The communications I/F 68 is an interface for making possible transmission of, for example, the image data to a personal computer or to other external devices.

The power supply circuit 69 is, for example, a constant voltage circuit, and generates a voltage for driving the entire image pickup device 1, such as the controlling sections (that is, the main controlling section 62, etc.), the image pickup element 101, and the various driving sections. Controlling of application of current to the image pickup element 101 is carried out on the basis of a control signal applied to the power supply circuit 69 from the main controlling section 62. The battery 69B is a primary battery (such as an alkaline dry battery) or a secondary battery (such as a nickel metal hydride rechargeable battery), and is a power supply that supplies electrical power to the entire image pickup device 1.

On the basis of the control signal applied from the main controlling section 62, the shutter driving controlling section 73A generates a driving control signal to the shutter driving actuator 73M. The shutter driving actuator 73M performs a driving operation for opening and closing the shutter unit 40.

On the basis of a control signal applied from the main controlling section 62, the diaphragm driving controlling section 76A generates a driving control signal to the diaphragm driving actuator 76M. The diaphragm driving actuator 76M applies driving power to the diaphragm driving mechanism 27 through the coupler 75.

Structure of Half Mirror 130

Figure 4:
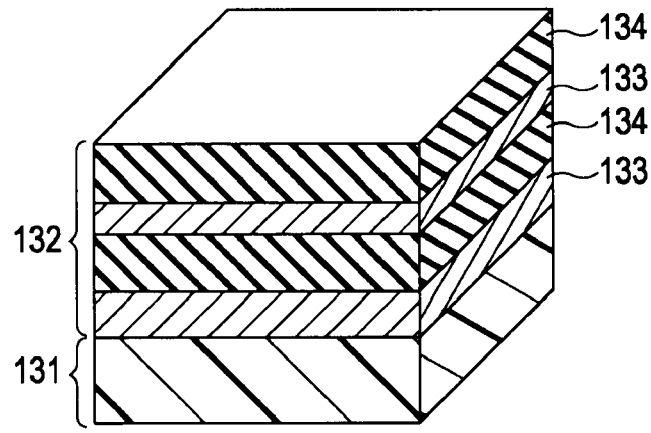
FIG. 4 illustrates a cross-sectional structure of a half mirror.

FIG. 4 illustrates a cross-sectional structure of a half mirror 130.

The half mirror 130 of the mirror section 13 includes a film 131 and an inorganic layer (inorganic-material layer) 132. The film 131 serves as a mirror base. The inorganic layer 132 is deposited and formed on the film 131. The half mirror 130 has, for example, a transmittance (optical transmission characteristic) of 70%, and a reflectivity (reflection characteristic) of 30%.

The film 131 is a transmissive film and has a transmittance of, for example, 90% (reflectivity of 10%). The film 131 is formed of a material that is optically isotropic, such as cycloolefin polymer that is commercialized as ZEONOR film (R).

Figure 5:
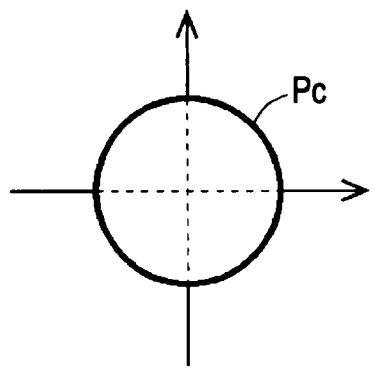
FIG. 5 is a conceptual diagram illustrating polarization characteristics of a cycloolefin polymer.
Figure 6A:
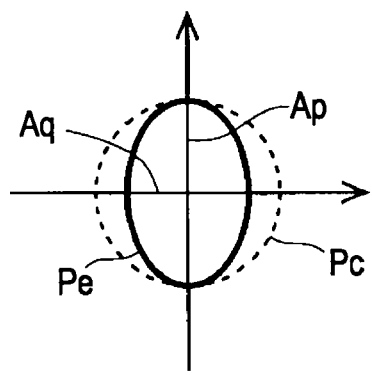
FIGS. 6A and 6B are conceptual views illustrating polarization characteristics of a PET film.
Figure 6B:
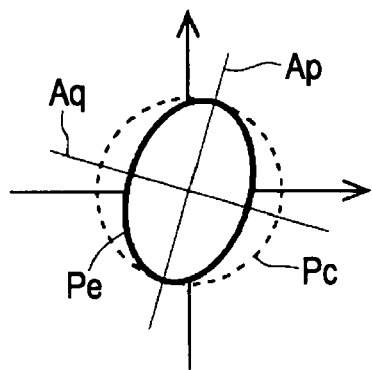

Cycloolefin polymer is a thermoplastic, high-functional, transmissive polymer manufactured by, for example, extrusion molding, and is an optical film not having a polarization axis as in a circle Pc shown in FIG. 5 showing polarization characteristics. In contrast, the polyethylene terephthalate (PET) film in the aforementioned related art is manufactured by a drawing process (vertical drawing and horizontal drawing). Therefore, the PET film has axes Ap and Aq having different transmission percentages in a long-axis direction and a short-axis direction of an ellipse Pe as in the ellipse Pe shown in FIG. 6A showing transmittance for each polarization angle. If a disposition direction is changed, the axes Ap and Aq are also inclined as shown in FIG. 6B. Accordingly, in the PET film that is optically anisotropic, the difference between the area of the ellipse Pe and the area of the circle Pc indicating an unpolarized state corresponds to light quantity loss (absorption). Therefore, if the half mirror 130 is used, the quantity of the transmitted light La (shown in FIG. 2) is reduced, thereby reducing the brightness level of an obtained image and causing the transmittance to differ for each wavelength. Consequently, there is a loss in white balance, as a result of which colors are not properly reproduced. Thus, in the image pickup device according to the embodiment, the cycloolefin polymer that is not polarized in any direction (such as three axial directions, x, y, and z, which are perpendicular to each other) is used for the film 131 of the half mirror 130, and light quantity loss is reduced. If the polarization axes are at undetermined levels, it is possible to reduce a reduction in resolution to the extent that birefringence is negligible.

The inorganic layer 132 is formed by alternately stacking a niobium pentoxide ($Nb_2O_5$) layer and a silicon dioxide ($SiO_2$) layer 134. For example, if the number of stacked layers is changed, it is possible to adjust the proportion between the quantity of transmitted light La (see FIG. 2) of the half mirror 130 and the quantity of reflected light Lb (see FIG. 2) of the half mirror 130. In other words, by properly adjusting, for example, the number of layers stacked in the inorganic layer 132 formed on the film 131 having a reflectivity of 10%, it is possible to produce the half mirror 130 having the aforementioned reflectivity of 30%.

In the image pickup device 1 described above, the optically transmissive film 131 serving as the mirror base of the half mirror 130 is formed of cycloolefin polymer that is optically isotropic and a certain rigidity. Therefore, it is possible to restrict breakage of the half mirror 130 without the possibility of the half mirror 130 cracking like a glass plate, and to reduce a reduction in resolution and light quantity loss compared to those in the PET film of the related art. Further, if cycloolefin polymer is used in the film 131, it is possible to further restrict the occurrence of uneven coloring caused by differences in the disposition direction compared to the PET film. This will be described with reference to FIGS. 7 and 8.

Figure 7:
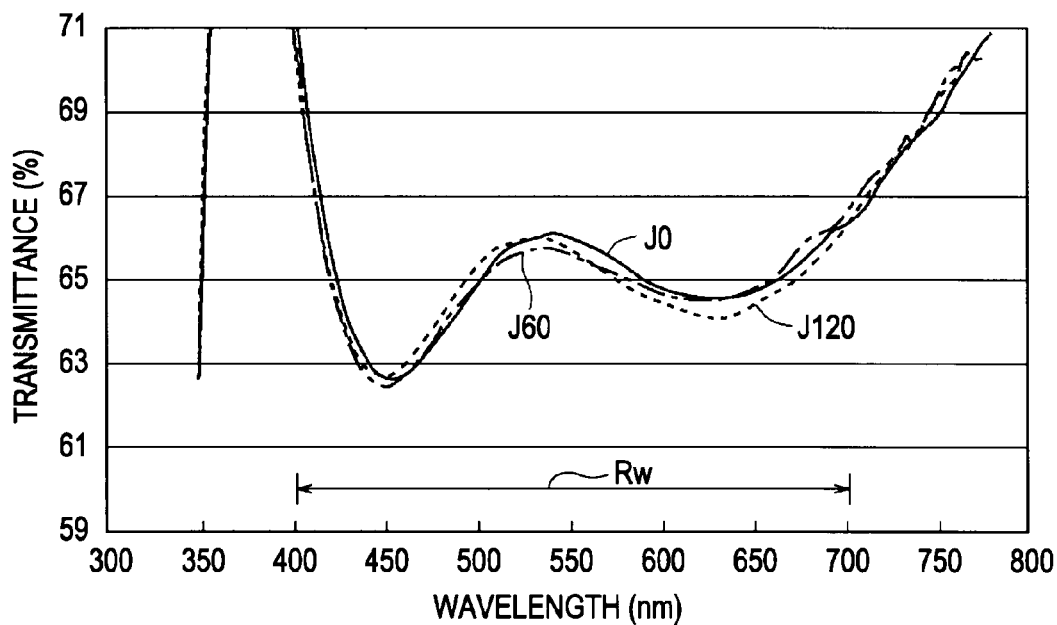
FIG. 7 is a graph illustrating spectral transmittance characteristics of the PET film.
Figure 8:
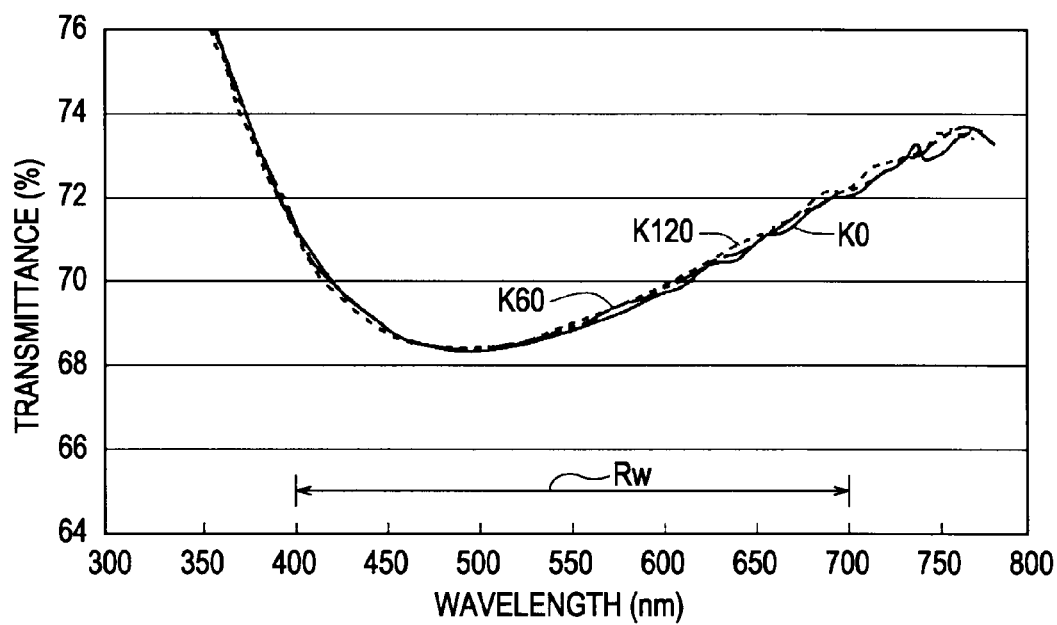
FIG. 8 illustrates spectral transmittance characteristics of the cycloolefin polymer.

FIG. 7 is a graph illustrating spectral transmittance characteristics of the PET film. FIG. 8 illustrates spectral transmittance characteristics of the cycloolefin polymer. In FIGS. 7 and 8, the horizontal axis represents the wavelength (nm) of light, and the vertical axis represents transmittance (%) of the light. The PET film in FIG. 7 and the cycloolefin polymer in FIG. 8 are in states in which their transmittances (reflectivities) are adjusted by the aforementioned inorganic layer.

FIG. 7 shows characteristics when the disposition direction of the PET film is changed 60° at a time, more specifically, spectral transmittance characteristics when the disposition direction is set to 0° (reference position), 60°, and 120° by a graph J0 (a solid line), a graph J60 (alternate long and short dash line), and a graph J120 (dotted line). Here, when the graphs J0, J60, and J120 are compared with each other at a spectrum region Rw of, for example, from 400 nm to 700 nm, the PET film that is optically anisotropic has different spectral transmittance characteristics in accordance with its disposition direction. Therefore, color unevenness corresponding to the disposition direction occurs in the PET film.

FIG. 8 shows characteristics when the disposition direction of the cycloolefin polymer is changed 60° at a time, more specifically, spectral transmittance characteristics when the disposition direction is set to 0° (reference position), 60°, and 120° by a graph K0 (a solid line), a graph K60 (alternate long and short dash line), and a graph K120 (dotted line). Here, when the graphs K0, K60, and K120 are compared with each other at the spectrum region Rw of, for example, from 400 nm to 700 nm, the cycloolefin polymer that is optically isotropic has substantially constant spectral transmittance characteristics even if its disposition direction is changed. Therefore, it is possible to restrict the occurrence of color unevenness caused by differences in the disposition direction in the cycloolefin polymer.

Therefore, when the cycloolefin polymer is used for the film 131, it is possible to restrict the occurrence of color unevenness compared to that in the related art.

Second Embodiment

Structure of Main Portion of Image Pickup Device

An image pickup device 1A according to a second embodiment of the present invention has a structure that is similar to that of the image pickup device according to the first embodiment shown in FIGS. 1 to 3. The image pickup device 1A differs from that according to the first embodiment in the structure of a half mirror of a mirror section. The structure of a half mirror 130A of a mirror section 13 provided at the image pickup device 1A will hereunder be described in detail.

Structure of Half Mirror 130A

Figure 9:
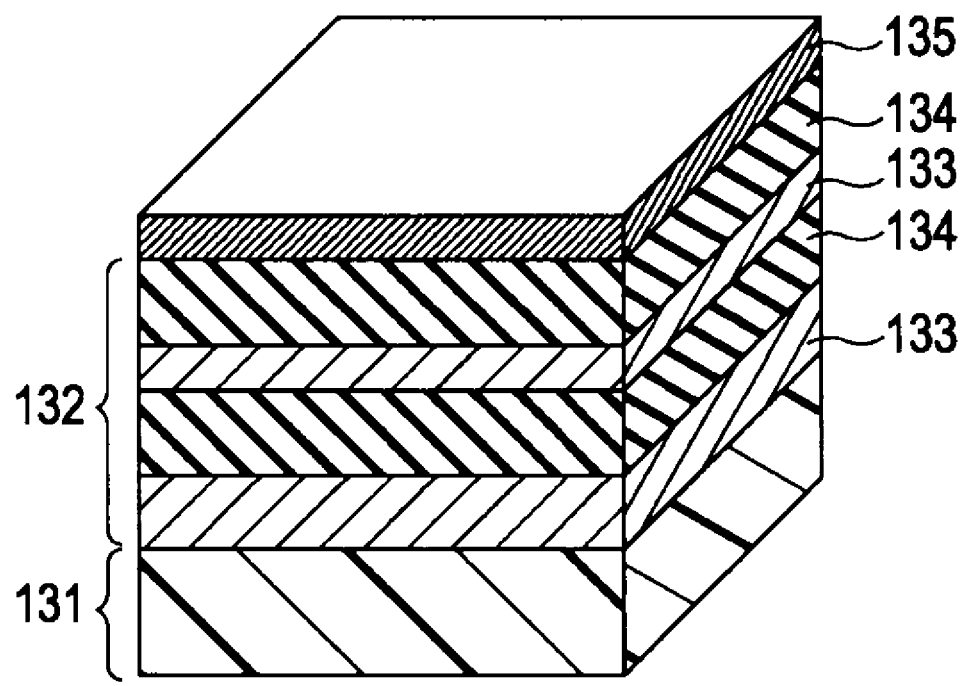
FIG. 9 illustrates a cross-sectional structure of a half mirror according to a second embodiment of the present invention.
Figure 10:
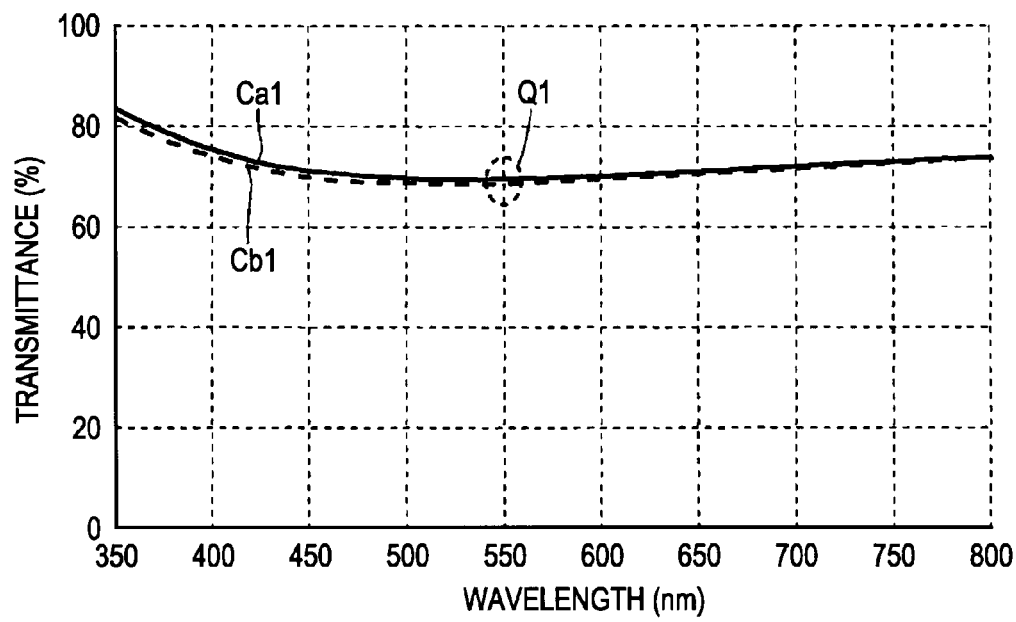
FIG. 10 is a graph showing the results of simulation of changes in the transmittance of the half mirror in accordance with the presence and absence of an antifouling coat layer having a layer thickness of 50 nm.
Figure 11:
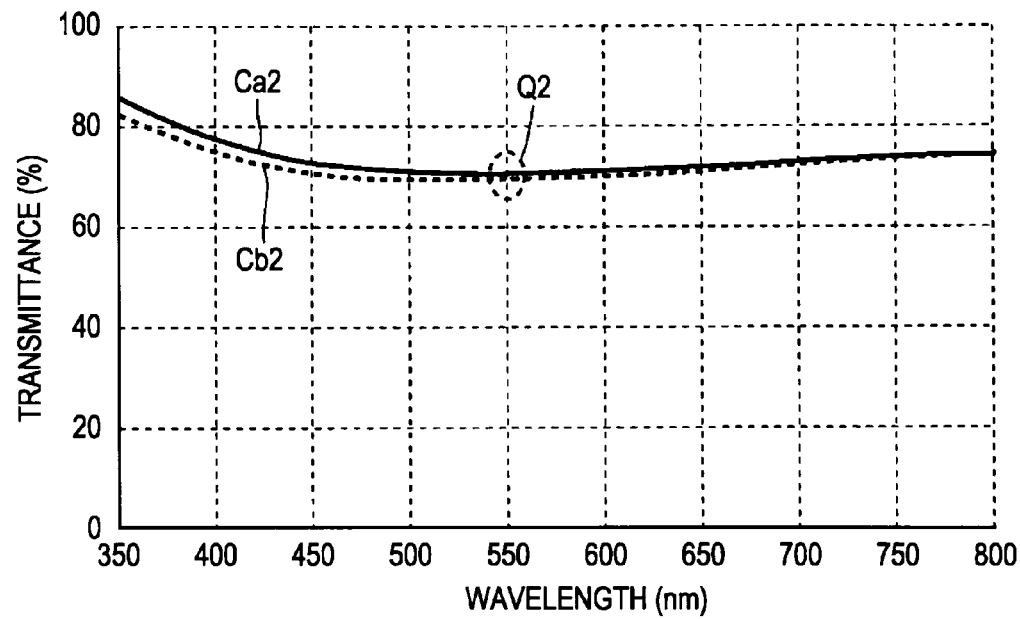
FIG. 11 is a graph showing the results of simulation of changes in the transmittance of the half mirror in accordance with the presence and absence of an antifouling coat layer having a layer thickness of 100 nm.
Figure 12:
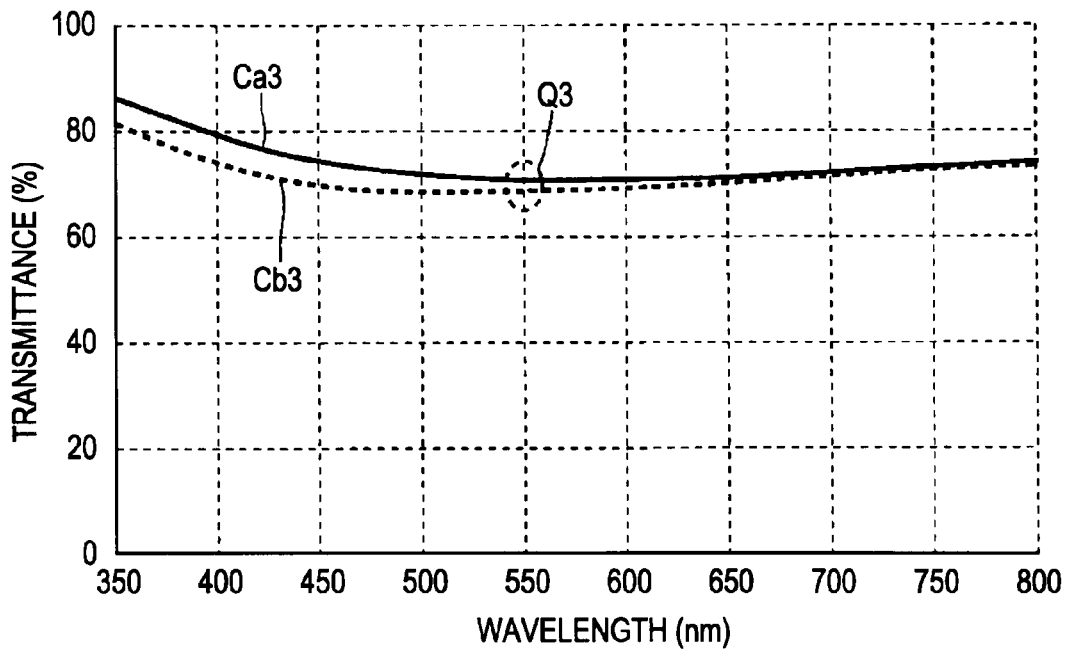
FIG. 12 is a graph showing the results of simulation of changes in the transmittance of the half mirror in accordance with the presence and absence of an antifouling coat layer having a layer thickness of 150 nm.
Figure 13:
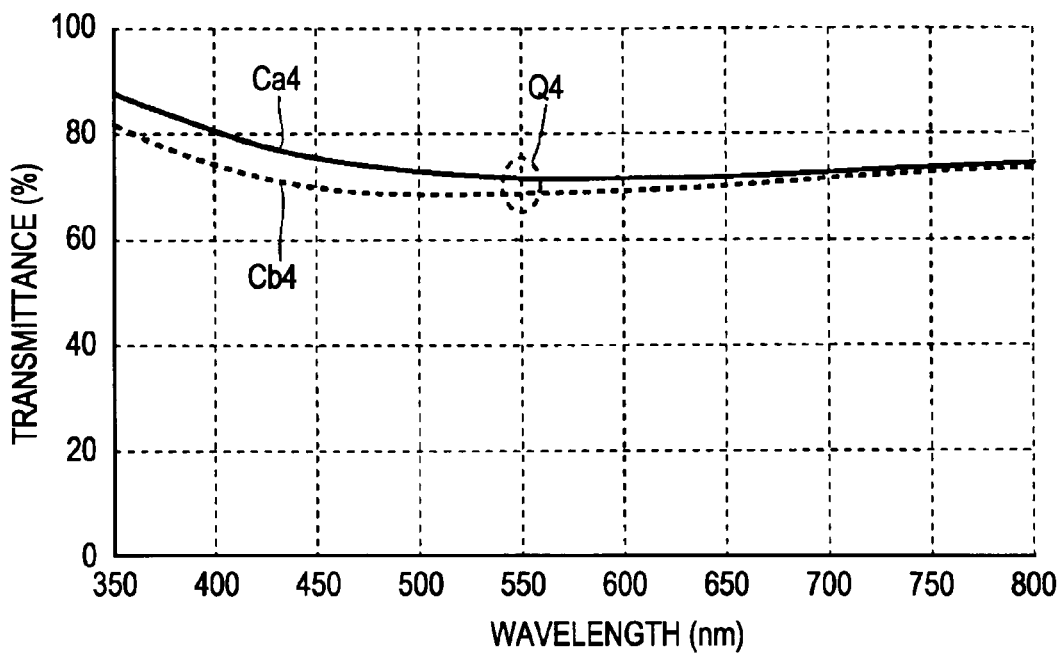
FIG. 13 is a graph showing the results of simulation of changes in the transmittance of the half mirror in accordance with the presence and absence of an antifouling coat layer having a layer thickness of 200 nm.
Figure 14:
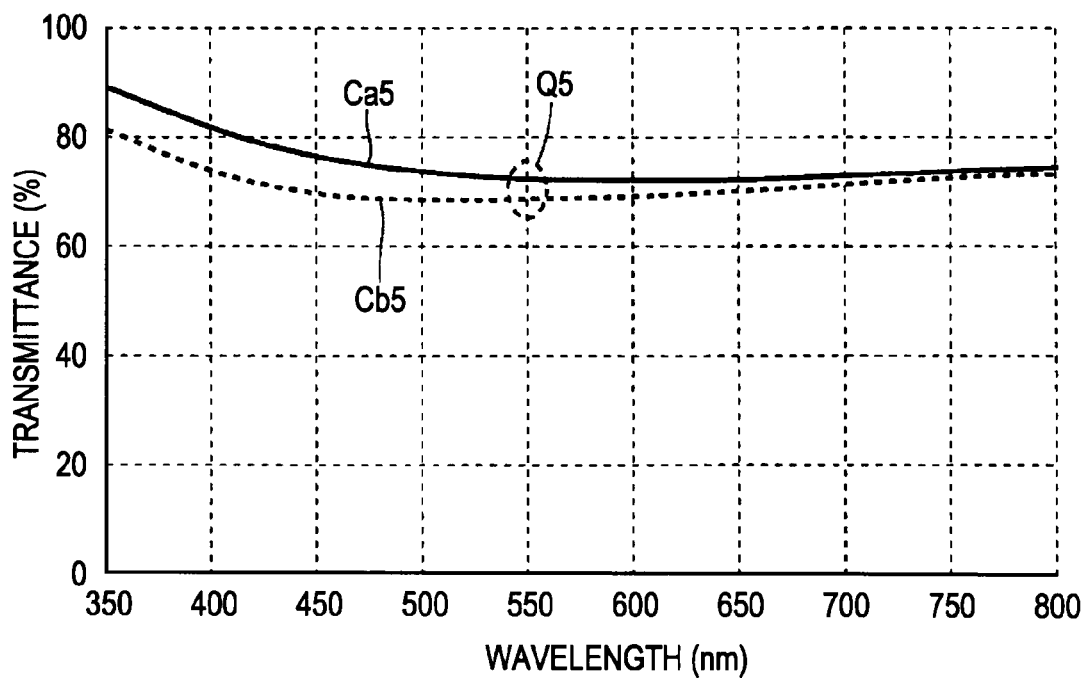
FIG. 14 is a graph showing the results of simulation of changes in the transmittance of the half mirror in accordance with the presence and absence of an antifouling coat layer having a layer thickness of 250 nm.

FIG. 9 illustrates a cross-sectional structure of the half mirror 130A.

The half mirror 130A is formed by providing the half mirror 130 according to the first embodiment shown in FIG. 4 with an antifouling coat layer 135 (formed as a layer on which antifouling coating is performed) at its uppermost portion.

That is, the half mirror 130A includes a film 131 (serving as a mirror base) and an inorganic layer 132 as with the first embodiment, and the antifouling coat layer 135 deposited on the inorganic layer 132. The half mirror 130A has, for example, a transmittance (optical transmission characteristic) of 70%, and a reflectivity (reflection characteristic) of 30%.

As in the first embodiment, the film 131 is formed as an optically transmissive film formed of a material that is optically isotropic. However, in the film 131 in the second embodiment, polycarbonate (PC) is used as its material.

As in the first embodiment, the inorganic layer 132 is formed by alternately stacking a niobium pentoxide layer and a silicon dioxide layer 134. That is, the inorganic layer 132 includes four layers (at least two layers) formed by stacking two types of inorganic materials including silicon dioxide. The topmost layer of the inorganic layer 132 is formed of silicon dioxide.

The antifouling coat layer 135 is generated by a fluorine coating operation using a fluorinated surface treatment agent. The antifouling coat layer 135 has, for example, a contact angle with respect to pure water of 105° and a surface tension of 15 mN/m. By the fluorine coating operation, it is possible to increase water repellency, oil repellency, slidability, and releasability, thereby increasing the cleanability of the half mirror 130A.

The antifouling coat layer 135 has the property of firmly sticking to silicon dioxide ($SiO_2$). Here, the antifouling coat layer 135 is in contact with the topmost silicon dioxide layer 134 among the four layers formed of an inorganic material and stacked upon each other in the inorganic layer 132. Therefore, the antifouling coat layer 135 is firmly joined to the inorganic layer 132.

The thickness of the antifouling coat layer 135 is on the order corresponding to one constituent element of the antifouling coat layer 135 formed by the fluorine coating operation (that is, 5 to 10 nm). If the thickness of the antifouling coat layer 135 is made very small to 10 nm or less, it is possible to reduce its influence on the optical characteristics of the half mirror 130A achieved by the film 131 and the inorganic layer 132. This will be described with reference to FIGS. 10 to 15.

FIGS. 10 to 14 are graphs showing the results of simulation of changes in the transmittance of the half mirror in accordance with the presence and absence of the antifouling coat layer 135. In FIGS. 10 to 14, the cases in which the thickness of the antifouling coat layer 135 is set to 50 nm, 100 nm, 150 nm, 200 nm, and 250 nm in that order are shown, respectively. In the graphs shown in FIGS. 10 to 14, the horizontal axis and the vertical axis represent the wavelength and the transmittance of light, respectively; and spectral characteristics Ca1 to Ca5 (solid lines) when the antifouling coat layer 135 is provided and spectral characteristics Cb1 to Cb5 (dotted lines) when the antifouling coat layer 135 is not provided are shown.

For the spectral characteristics Ca1 to Ca5 when the antifouling coat layer 135 is provided and for the spectral characteristics Cb1 to Cb5 when the antifouling coat layer 135 is not provided, if, as typical wavelengths, wavelengths near 550 nm in broken-line circles Q1 to Q5 are compared with each other, there is almost no change in the transmittance of the half mirror regardless of the presence or absence of the antifouling layer 135 in the cases (FIGS. 10 and 11) in which the thickness of the antifouling coat layer 135 is 10 nm or less. However, the transmittance of the half mirror changes significantly in accordance with the presence and absence of the antifouling coat layer 135 in the cases (FIGS. 12 to 14) in which the thickness of the antifouling coat layer 135 is greater than 10 nm. Therefore, if the antifouling coat layer 135 is deposited to a thickness of 10 nm or less, it has almost no influence on the spectral characteristics of the half mirror 130A achieved by the film 131 and the inorganic layer 132.

Figure 15:
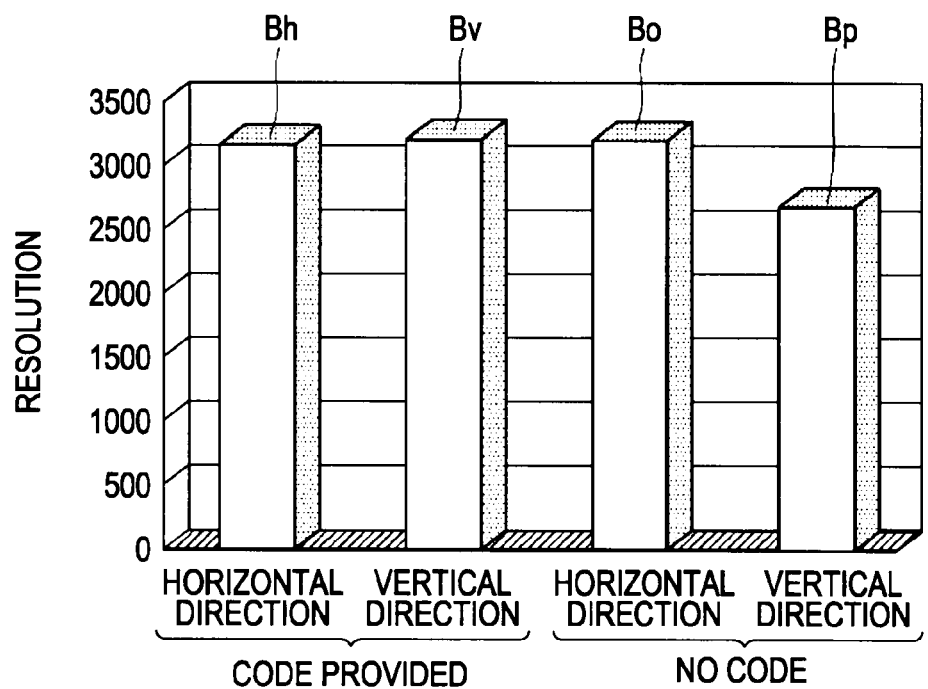
FIG. 15 is a graph showing the results of simulation of changes in the resolution of the half mirror in accordance with the presence and absence of an antifouling coat layer.

FIG. 15 is a graph showing changes in the resolution of the half mirror in accordance with the presence and absence of the antifouling coat layer 135. FIG. 15 shows bar graphs Bo and Bp of the resolutions in the horizontal and vertical directions when there is no coating (that is, when the antifouling coat layer 135 is not provided) and bar graphs Bh and By of the resolution in the horizontal and vertical directions where there is a coating (that is, when the antifouling coat layer 135 is provided).

If the bar graphs Bo and Bp (of the resolutions when the antifouling coat layer 135 is not provided) and the bar graphs Bh and By (of the resolutions when the antifouling coat layer 135 is provided) are compared with each other, almost no changes occur in the resolutions regardless of the presence or absence of the antifouling coat layer 135 for the horizontal direction, whereas the resolutions are increased when the antifouling coat layer 135 is provided for the vertical direction. Therefore, even if the extremely thin antifouling coat layer 135 is added, its influence on the resolutions of the half mirror 130A achieved by the film 131 and the inorganic layer 132 is very low.

Experiments in which the degrees of flare caused by haze were compared in accordance with the presence and absence of the antifouling coat layer 135 were carried out. The results showed that there were almost no changes in the degrees of flare, so that, from this viewpoint, the influence of the antifouling coat layer 135 on the optical characteristics of the half mirror 130A is considerably low.

Accordingly, by the antifouling coat layer 135 having a thickness (that is, 10 nm or less) that has almost no influence on the optical characteristics of the half mirror 130A achieved by the film 131 and the inorganic layer 132, it is possible to restrict variations in the manufacturing of half mirrors 130A caused by antifouling coat layers 135, reduce the tendency with which dirt adheres to the surface of the half mirror 130A, and make it easier to remove the adhered dirt. In addition, by forming the antifouling coat layer 135 at a surface of the half mirror 130A, it is possible to increase chemical resistance; reduce the frequency with which alcohol (such as ethanol) used in removing, for example, the adhered dirt attacks the inorganic layer 132; and prevent film peeling, cracks, and breakage.

That is, in the related pellicle mirror (fixed type mirror) of an image pickup device, since its surface is not subjected to antifouling coating such as a fluorine coating operation, dust or dirt tends to adhere to the half mirror, thereby making it difficult to remove the adhered dust or dirt. In addition, if the half mirror is wiped using alcohol or the like (solvent) for removing the adhered dust or dirt, the half mirror is attacked by, for example, alcohol and its surface is peeled, etc. In contrast, if the antifouling coat layer 135 is provided at the surface of the half mirror 130A in the embodiment, these problems of the related art are overcome.

In the half mirror 130A of the image pickup device 1A described above, since the antifouling coat layer 135 is formed on the inorganic layer (inorganic-material layer) 132, dust or dirt seldom adheres to the half mirror 130A. Even if dust or dirt adheres to the antifouling coat layer 135, it can be easily wiped off from the half mirror 130A, and the half mirror 130A is seldom attacked by solvents, such as alcohol, used to remove the adhered dust or dirt. Since the half mirror 130A includes the film 131 that is optically isotropic, it is possible to reduce light quantity loss and reductions in resolution while restricting breakage of the half mirror as in the first embodiment.

In the image pickup device 1A, a half mirror formed by adding a hard coat layer to the half mirror 130A may be included. This structure is described in detail with reference to FIG. 16.

Figure 16:
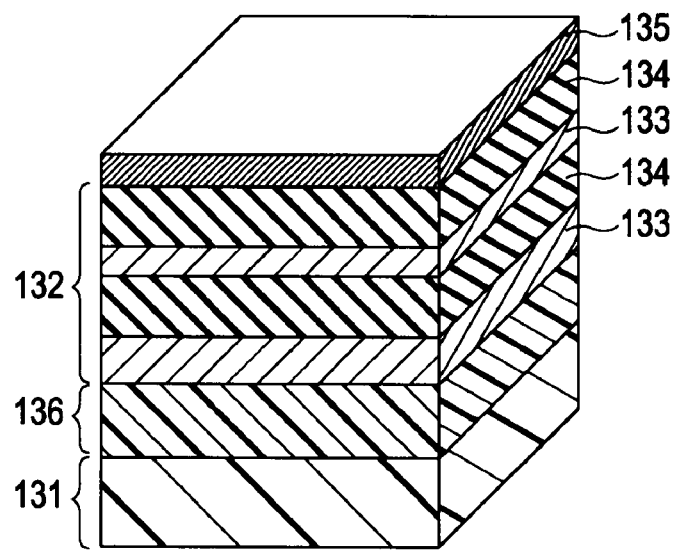
FIG. 16 illustrates a cross-sectional structure of a half mirror provided with a hard coat layer.

FIG. 16 illustrates a cross-sectional structure of a half mirror 130B provided with a hard coat layer 136.

In the half mirror 130B, the hard coat layer 136 is added directly on the film 131 of the half mirror 130A shown in FIG. 9. The hard coat layer 136 is formed by performing an UV processing operation on an acrylic ultraviolet (UV) curing material. This hard coat layer 136 has a thickness of, for example, 1000 nm to 6000 nm, and has a hardness (pencil hardness of Japanese Industrial Standards (JIS)) on the order of H or higher.

By interposing such a hard coat layer 136 between the film 131 and the inorganic layer (inorganic-material layer) 132, it is possible to increase the strength of the half mirror 130B.

It is not necessary for the structure of the half mirror including the hard coat layer 136 to be the structure of the half mirror 130B shown in FIG. 16. A structure in which the antifouling coat layer 135 is removed from the half mirror 130B may also be used. In this case, since the hard coat layer 136 having a thickness on the order of that mentioned above (1000 nm to 6000 nm) exists directly on top of the film 31, the chemical resistance of the film 131 is increased.

Modifications

Figure 17:
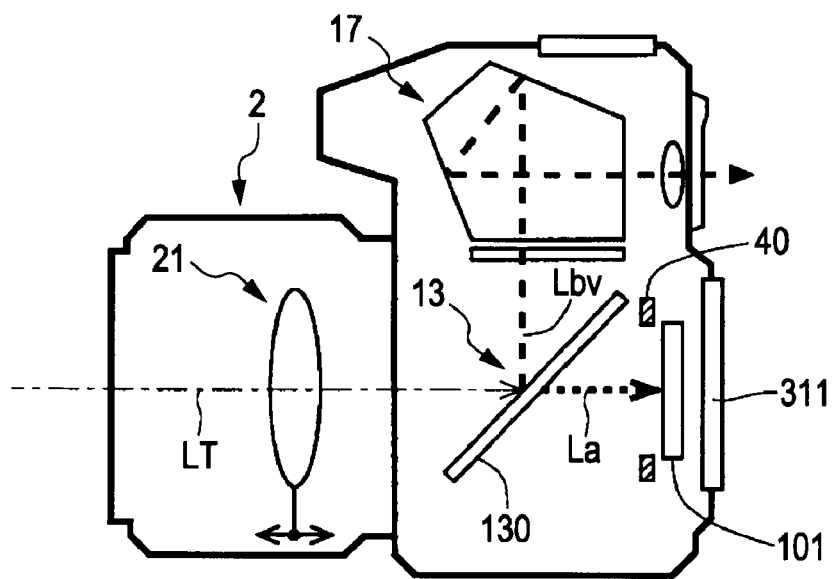
FIG. 17 is a vertical sectional view of an image pickup device according to a modification of the present invention.

In the first embodiment, it is not necessary to cause the reflected light Lb from the half mirror 130 to be incident upon the phase-difference AF module 107 as it is in the image pickup device 1 shown in FIG. 2. The reflected light Lb may be incident upon an optical finder 17 as it is in an image pickup device 1B shown in FIG. 17. In the structure of the image pickup device 1B, the present invention is also applicable to a film camera provided with a silver-salt film as image pickup unit (that forms (generates) an image of an object) instead of the image pickup element 101.

In the half mirror film in each of the above-described embodiments, it is not necessary to use cycloolefin polymer or polycarbonate. A film formed of other materials that is optically isotropic, such as triacetyl cellulose (TAC), polyether sulphone (PES), or triacetyl cellulose (TAC) may also be used.

The term "optical isotropy" in the present invention not only strictly means optically isotropic, but also may mean slightly anisotropic due to manufacturing errors and measurement errors (evaluation errors).

The present application contains subject matter related to those disclosed in Japanese Priority Patent Applications JP 2009-111766 and JP 2009-286657 filed in the Japan Patent Office on May 1, 2009 and Dec. 17, 2009, respectively, the entire contents of which are hereby incorporated by reference.

Although the present invention is described in detail, the foregoing description merely gives exemplifications in all situations. Therefore, the present invention is not limited to these exemplifications. It is to be understood that countless unexemplified modifications are within the scope of the present invention.

What is claimed is:

1. An image pickup device comprising:
a fixedly provided half mirror that separates object light that has passed through a shooting optical system into transmitted light and reflected light, the half mirror including a hard coat layer with a thickness from 1000 nm to 6000 nm; and
image pickup means for generating an image of an object by receiving the transmitted light, wherein the half mirror includes an optically transmissive film that is optically isotropic.

2. The image pickup device according to claim 1, wherein the half mirror further includes an inorganic-material layer disposed on the optically transmissive film, the inorganic-material layer adjusting a proportion between a quantity of the transmitted light and a quantity of the reflected light.

3. The image pickup device according to claim 2, wherein the half mirror further includes an antifouling coat layer disposed on the inorganic-material layer.

4. The image pickup device according to claim 3, wherein the antifouling coat layer is a layer subjected to a fluorine coating operation.

5. The image pickup device according to claim 3, wherein a thickness of the antifouling coat layer is 10 nm or less.

6. The image pickup device according to claim 3, wherein the inorganic-material layer includes two or more layers formed by stacking a plurality of types of inorganic material including silicon dioxide upon each other, and wherein the layer that contacts the antifouling coat layer among the two or more layers of the inorganic-material layer is formed of the silicon dioxide.

7. The image pickup device according to either claim 2 or 3, wherein the hard coat layer is interposed between the optically transmissive film and the inorganic-material layer.

8. The image pickup device according to claim 7, wherein the hard coat layer is formed of an acrylic ultraviolet curing material.

9. The image pickup device according to claim 1, wherein the optically transmissive film is formed of cycloolefin polymer or triacetyl cellulose.

10. The image pickup device according to claim 1, further comprising a focus detecting section that obtains focus detection information of the object by receiving the reflected light.

11. An image pickup device comprising:
a fixedly provided half mirror that separates object light that has passed through a shooting optical system into transmitted light and reflected light, the half mirror including a hard coat layer with a thickness from 1000 nm to 6000 nm; and
an image pickup unit that generates an image of an object by receiving the transmitted light, wherein the half mirror includes an optically transmissive film that is optically isotropic.

* * * * *